US009799333B2

United States Patent
Kintzley et al.

(10) Patent No.: US 9,799,333 B2
(45) Date of Patent: *Oct. 24, 2017

(54) SYSTEM AND METHOD FOR PROCESSING SPEECH TO IDENTIFY KEYWORDS OR OTHER INFORMATION (71) Applicants: Keith Kintzley, Severna Park, MD (US); Aren Jansen, Ellicott City, MD (US); Hynek Hermansky, Baltimore, MD (US); Kenneth Church, Croton-on-Hudson, NY (US)

(72) Inventors: Keith Kintzley, Severna Park, MD (US); Aren Jansen, Ellicott City, MD (US); Hynek Hermansky, Baltimore, MD (US); Kenneth Church, Croton-on-Hudson, NY (US)

(73) Assignee: The Johns Hopkins University, Baltimore, MD (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/840,089

(22) Filed: Aug. 31, 2015

(65) Prior Publication Data
US 2015/0371635 A1 Dec. 24, 2015

Related U.S. Application Data (63) Continuation of application No. 13/926,659, filed on Jun. 25, 2013, now Pat. No. 9,177,547.

(51) Int. Cl.
G10L 15/00 (2013.01)
G10L 15/22 (2006.01)
(Continued)

(52) U.S. Cl.
CPC .............. *G10L 15/22* (2013.01); *G10L 15/14* (2013.01); *G10L 2015/085* (2013.01); *G10L 2015/088* (2013.01)

(58) Field of Classification Search
CPC ..... G10L 15/08; G10L 15/088; G10L 15/187; G06F 17/20
(Continued)

(56) References Cited

U.S. PATENT DOCUMENTS

2007/0038447 A1* 2/2007 Kaneko ................... G10L 15/02
704/239
2011/0144995 A1 6/2011 Bangalore et al.
2011/0218805 A1* 9/2011 Washio ................... G10L 15/00
704/251

FOREIGN PATENT DOCUMENTS

EP 2189976 A1 5/2010

OTHER PUBLICATIONS

Jansen et al (2009) Point Process Models for Spotting Keywords in Continuous Speech. IEEE Transactions on Audio, Speech, and Language Processing, 17(8):1457-1470.
(Continued)

Primary Examiner — Daniel Abebe
(74) Attorney, Agent, or Firm — Johns Hopkins Technology Ventures (57) ABSTRACT A system and method are provided for performing speech processing. A system includes an audio detection system configured to receive a signal including speech and a memory having stored therein a database of keyword models forming an ensemble of filters associated with each keyword in the database. A processor is configured to receive the signal including speech from the audio detection system, decompose the signal including speech into a sparse set of phonetic impulses, and access the database of keywords and convolve the sparse set of phonetic impulses with the ensemble of filters. The processor is further configured to identify keywords within the signal including speech based (Continued)

a result of the convolution and control operation the electronic system based on the keywords identified.

20 Claims, 9 Drawing Sheets (51) Int. Cl.
*G10L 15/14* (2006.01)
*G10L 15/08* (2006.01)
(58) Field of Classification Search
USPC .......................................................... 704/251
See application file for complete search history.

(56) References Cited

OTHER PUBLICATIONS

Kintzley et al (2011) Event Selection from Phone Posteriorgrams Using Matched Filters. Interspeech, pp. 1905-1908.
Kintzley et al (2012) Inverting the Point Process Model for Fast Phonetic Keyword Search. Interspeech, pp. 2438-2441.
Kintzley et al (2012) MAP Estimation of Whole-Word Acoustic Models with Dictionary Priors. Interspeech, pp. 787-790.

* cited by examiner

SYSTEM AND METHOD FOR PROCESSING SPEECH TO IDENTIFY KEYWORDS OR OTHER INFORMATION

CROSS-REFERENCE TO RELATED APPLICATIONS

This application is a continuation of U.S. patent application Ser. No. 13/926,659 filed Jun. 25, 2013.

STATEMENT REGARDING FEDERALLY SPONSORED RESEARCH

This invention was made with government support under H98230-07-C-0365 awarded by the Department of Defense. The government has certain rights in the invention.

BACKGROUND OF THE INVENTION

This present invention relates generally to receiving and processing speech signals, and more specifically, techniques to identify keywords in speech, for example, for use in command and control of an electronic device.

The presence of electronic devices in personal and professional settings has increased to the extent that manual operation may no longer be sufficient or suitable to take advantage of their full capabilities. Configurations of electronic devices that include voice-activated, command and control abilities offer practical and convenient methods for operation, in addition to direct physical input. However, voice operation requires rapid and accurate processing of speech signals, using reliable models that address user variability, distortions, and detection errors.

Traditionally, isolated word recognition systems were constructed using models for entire words. Although practical for limited vocabulary size, demand for larger vocabulary necessitated the use of sub-word units to enable the sharing of training examples across contexts and permit the modeling of out-of-vocabulary words. Current, state-of-the-art spoken term detection systems typically employ large vocabulary databases and are based on automatic speech recognition (ASR) methods based on lattice searching. Although these systems have demonstrated good recognition performance, generating comprehensive sub-word lattices and spotting keywords in a large lattice is a slow process with a cost of high computational overhead.

Thus far, systems with limited processing and storage capacities, such as portable electronic devices, have had to rely upon network connectivity, remote data storage, and powerful processing servers to perform computationally-intensive tasks and access larger vocabulary databases.

Consequently, there exists a need for a system and method in the art that can achieve fast and reliable recognition of audio input without the explicit need for remote servers, communications with a network, and any other remote data storage and processing units. Also, there exists a need for a system and method in the art that can be implemented on an electronic device with limited processing resources. Furthermore, there exists a need for a system and method in the art that can construct and implement efficient keyword search models in the absence of substantial amounts of training data. In addition to the above, there exists a need for a system and method in the art that can handle out-of-vocabulary keywords.

SUMMARY OF THE INVENTION

The present invention overcomes the above and other drawbacks by providing a system and method for speech signal processing that is computationally rapid, efficient, and does not require external resources for processing and execution support.

In accordance with one aspect of the invention, an electronic system configured to perform speech processing is disclosed that includes an audio detection system configured to receive a signal including speech and a memory having stored therein a database of keyword models forming an ensemble of filters associated with each keyword in the database. The system also includes a processor configured to receive the signal including speech from the audio detection system, decompose the signal including speech into a sparse set of phonetic impulses, and access the database of keywords and convolve the sparse set of phonetic impulses with the ensemble of filters. The processor is also configured to identify keywords within the speech signal using the convolved impulses and filters and control operation the electronic system based on the keywords identified.

In accordance with another aspect of the invention, a method for perform speech processing is disclosed that includes the steps of a) receiving a signal including speech, b) accessing a database of keyword models forming an ensemble of filters associated with each keyword in the database, and c) decomposing, with an electronic system, the signal including speech into a sparse set of phonetic impulses. The method also includes the steps of d) accessing, with an electronic system, the database of keywords and convolve the sparse set of phonetic impulses with the ensemble of filters and e) identifying, with an electronic system, keywords within the signal including speech based on step d). The method also includes f) controlling operation the electronic system based on the keywords identified in step e).

In accordance with yet another aspect of the invention, an electronic system configured to perform speech processing is disclosed that includes an audio detection system configured to receive a signal and generate a representation of speech as a sparse set of phonetic events in time. The system also includes a memory having stored therein a database of keyword models forming an ensemble of filters based upon Poisson rate parameters describing an evolution of phonetic events associated with each keyword in the database of keywords. The system further includes a processor configured to i) receive the representation of speech from the audio detection system, ii) decompose the representation of speech into a sparse set spare set of phonetic impulses, and iii) access the database of keywords and convolve the sparse set of phonetic impulses with the ensemble of filters. The processor is also configured to iv) identify keywords within the speech signal based on iii) and v) control operation the electronic system based on the keywords identified in iv).

The foregoing and other advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
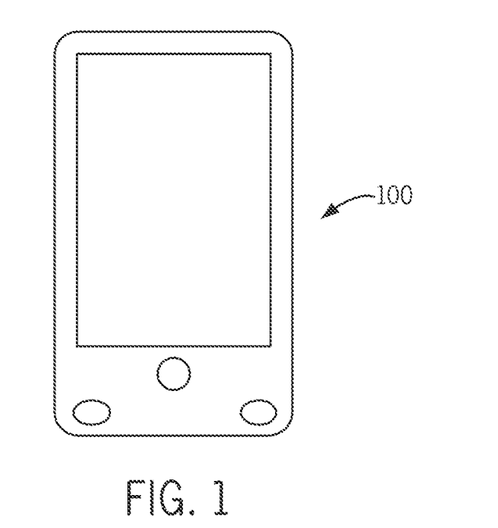
FIG. 1 is a plan view of an illustrative electronic device configured in accordance with the present invention.

FIG. 1 depicts a plan view of an illustrative electronic device 100, which may be mobile, portable, or part of any system, machine, and vehicle. For example, the device 100 may be a mobile phone, tablet, or other personal electronic device. In this regard, the device 100 may be a general computing device that may integrate a variety of software and hardware capabilities and functionality. Furthermore, the device 100 may be navigation device, camera or other specialized computing or electronics device.

Figure 2:
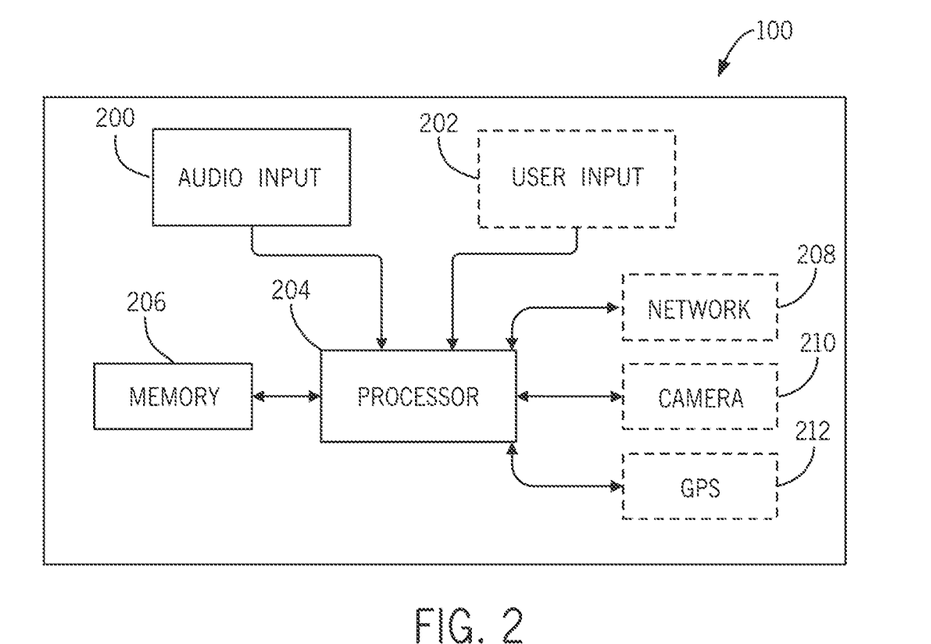
FIG. 2 is a schematic diagram of the illustrative electronic device of FIG. 1 for use in accordance with the present invention.

Referring to FIG. 2, regardless of the particular hardware or software capabilities of the device 100, the device 100 may include some common hardware. For example, as will be described, the device 100 includes an audio input 200, which may include a microphone or other systems, including an electronic input, to receive auditory audio signals or captured audio signals. Also, if desired, the device 100 may include additional user inputs 202, for example, such as buttons, touch displays, and the like. The device 100 includes a processor 204 that is designed to carry out any number of actions. As will be described, the processor 204, in addition to other processing tasks, is capable of autonomous and semi-autonomous recognition of speech. A memory 206 is provided that may store instructions for operating the processor 204. In addition, the memory 206 may be used by the processor for storing and retrieving raw and processed data. The device 100 may include network communications hardware and software 208. Other optional hardware and software may include a camera 210 or global positional system hardware and software 212. Of course a wide variety of additional hardware and software may be integrated the device 100 to be controlled by or to communicate with the processor 204 such that, as will be described, the capabilities of the device may be utilized based on speech signals.

Figure 3:
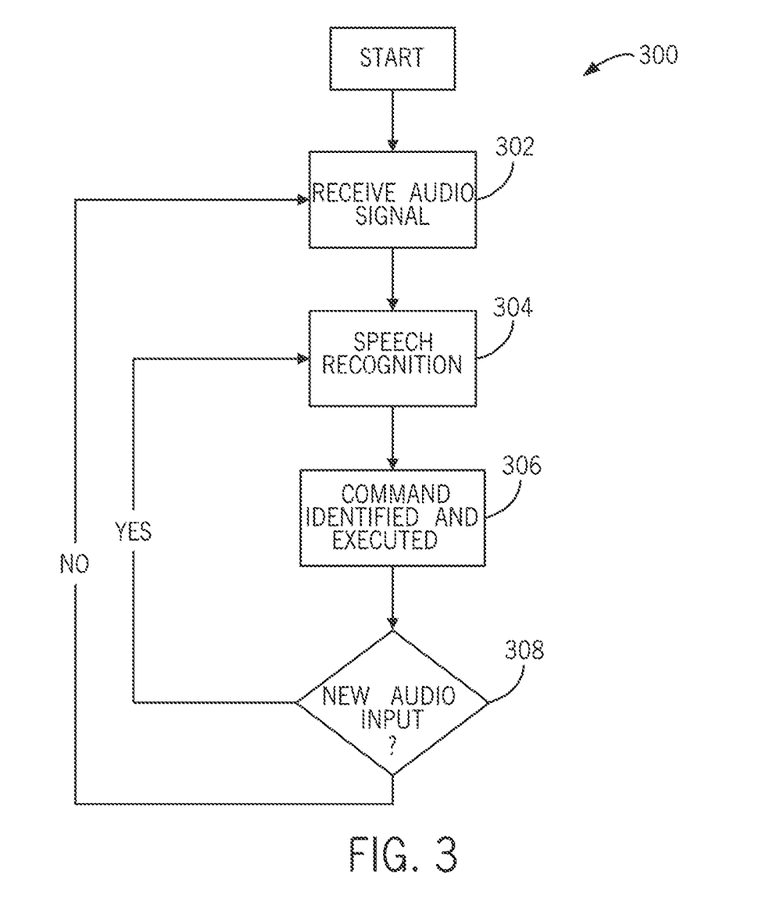
FIG. 3 is a flowchart setting forth steps of an exemplary operation of the illustrative electronic device in accordance with the present invention.

Specifically, referring to FIG. 3, exemplary steps of a processes 300 for such speech-based control is provided. The process 300 begins at process bock 302 with the reception of an audio signal. The audio signal may be captured by a microphone, such as described above, or may be previously acquired and provided as an analog or digital representation of the audio signal. At process block 304, the audio signal is subjected to a speech recognition process that identifies potential speech within the audio signal and identifies keywords in speech. Once one or more speech signals are identified, at process block 306, the one or more speech signals are analyzed to determine whether any commands are included in the speech signals and, if so, the commands are executed. The above-described process is ongoing and, thus, at decision block 308, if further audio input is received immediately, the process reiterates to analyze the further audio input. If, at decision block 308, new audio input is not immediately received, the process reiterates to await the receipt of a new audio signal at process block 302.

Figure 4:
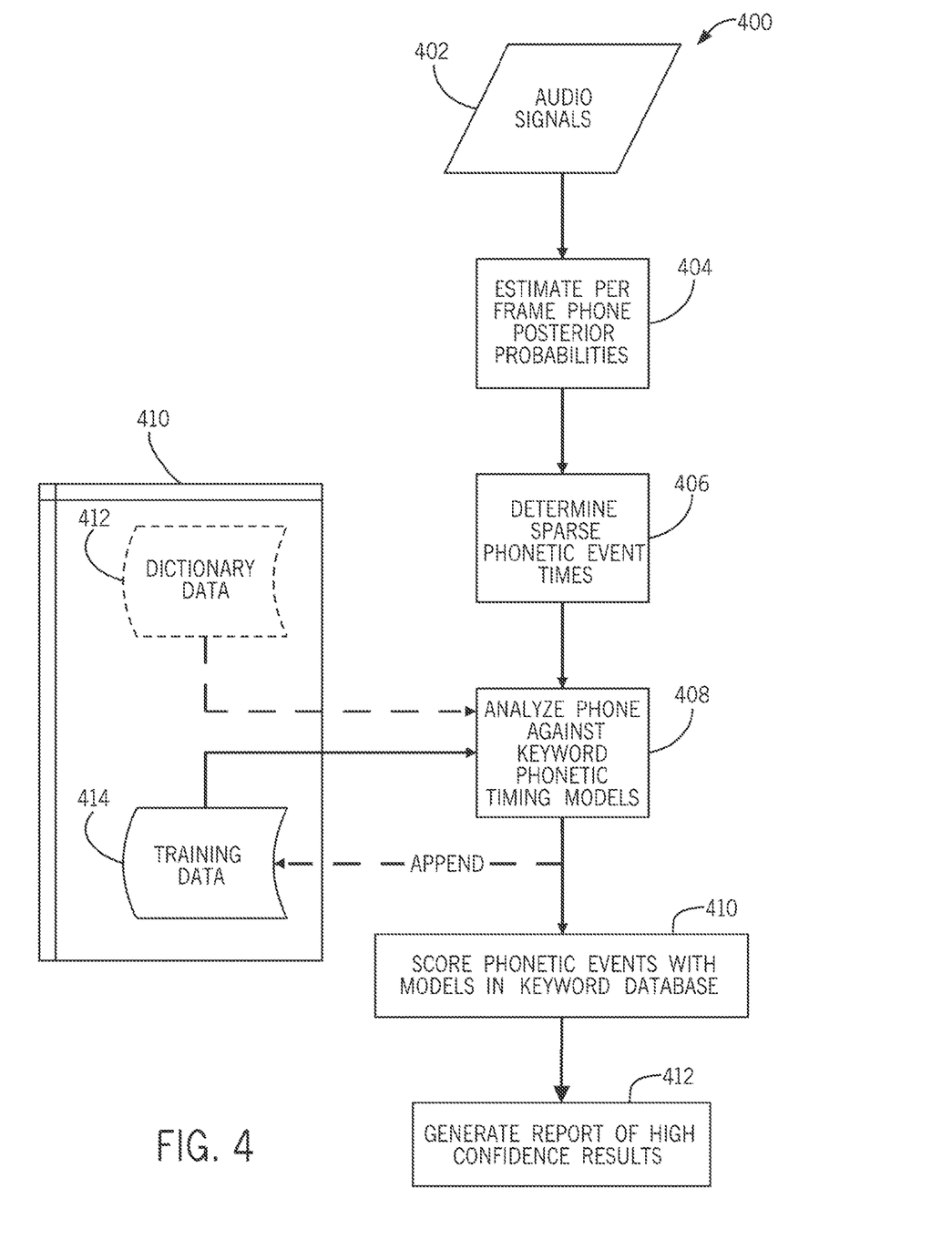
FIG. 4 is a flowchart illustrating the steps of an exemplary speech processing in accordance with the present invention.

Referring now to FIG. 4, a process 400 for determining words or keywords in an audio signal is illustrated. As will be described, the present method may utilize a point process model (PPM). The process 400 begins by analyzing audio signals 402 to determine acoustic features indicative of speech signals. Specifically, at process block 404 speech signals are identified and classified in the representation of a phonetic posteriorgrams, which is a time versus class matrix corresponding to a posterior probability of each phonetic class at each specific time frame of speech. In this regard, as will be described in further detail, the signal including speech may be processed to yield a sparse set of phonetic events in time.

Figure 5:
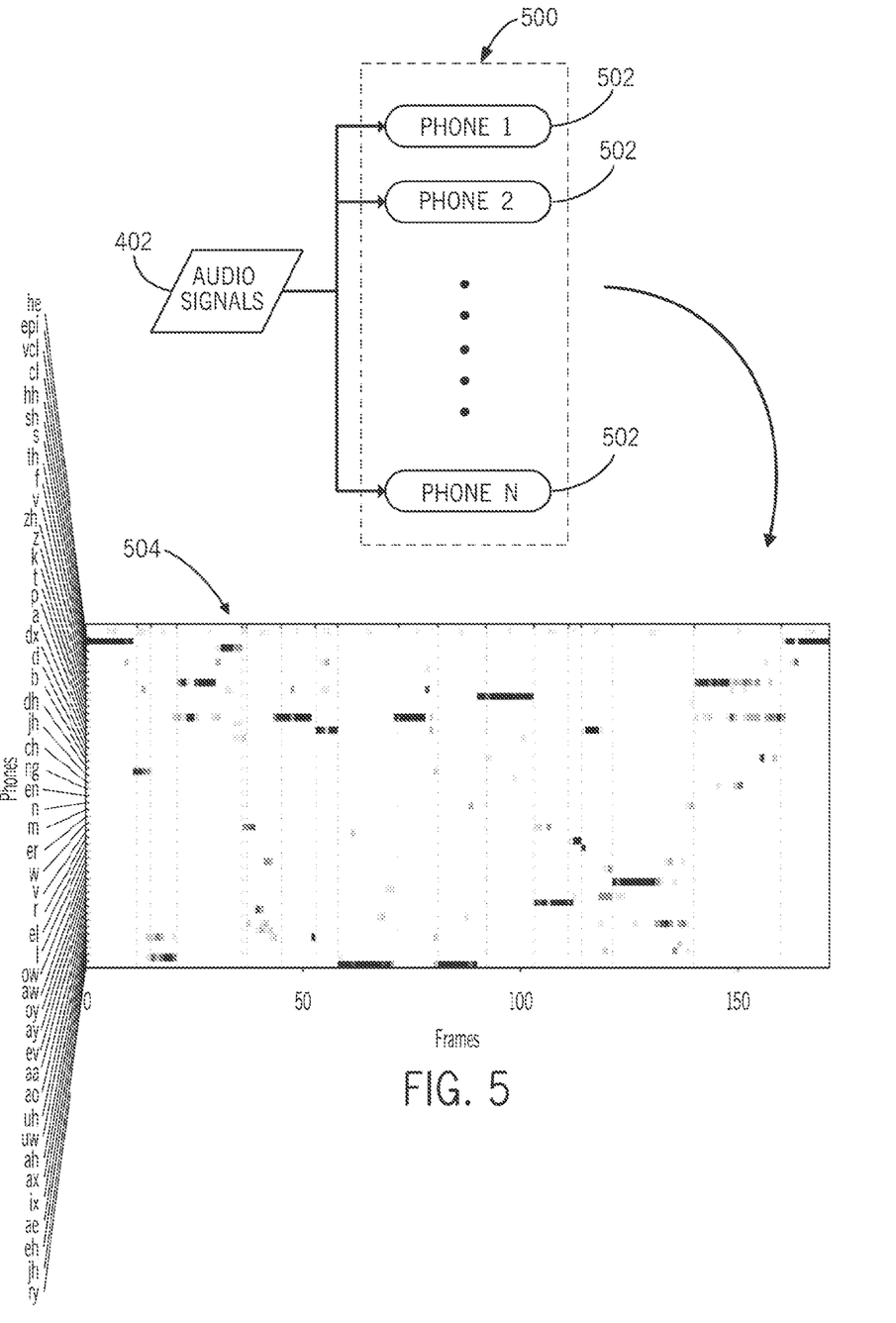
FIG. 5 is a schematic diagram illustrating the steps for determining a matching score in accordance with the present invention.

Referring to FIG. 5, posteriorgrams 504 may be computed directly from the frame-based acoustic likelihood scores for each phonetic class at each time frame. Alternatively, a phonetic recognizer 500 may use both acoustic and phonetic language model scores to generate a lattice, and the posteriorgram can be computed directly from this lattice. An utterance reflected in audio signals 402 is composed of a series discrete phones 502, and so a posteriorgram representation contains surplus information. Since keyword identification is often concerned with searching through large volumes of speech data, a simplified representation is more rapid and efficient.

For example, speech signal processing may be sampled at a rate of 100 samples or frames per second, that is a frame rate of 100 Hz. Computations on the signal are also computed at this rate. In this example, it would be reasonable to assume that there might be approximately 175 frames and 40 phones, which would result in 7000 floating-point values to describe an utterance of 40 phones over 175 frames. As will be further described, the present invention substantially improves the speed and efficiency of the process of analyzing speech.

Figure 6:
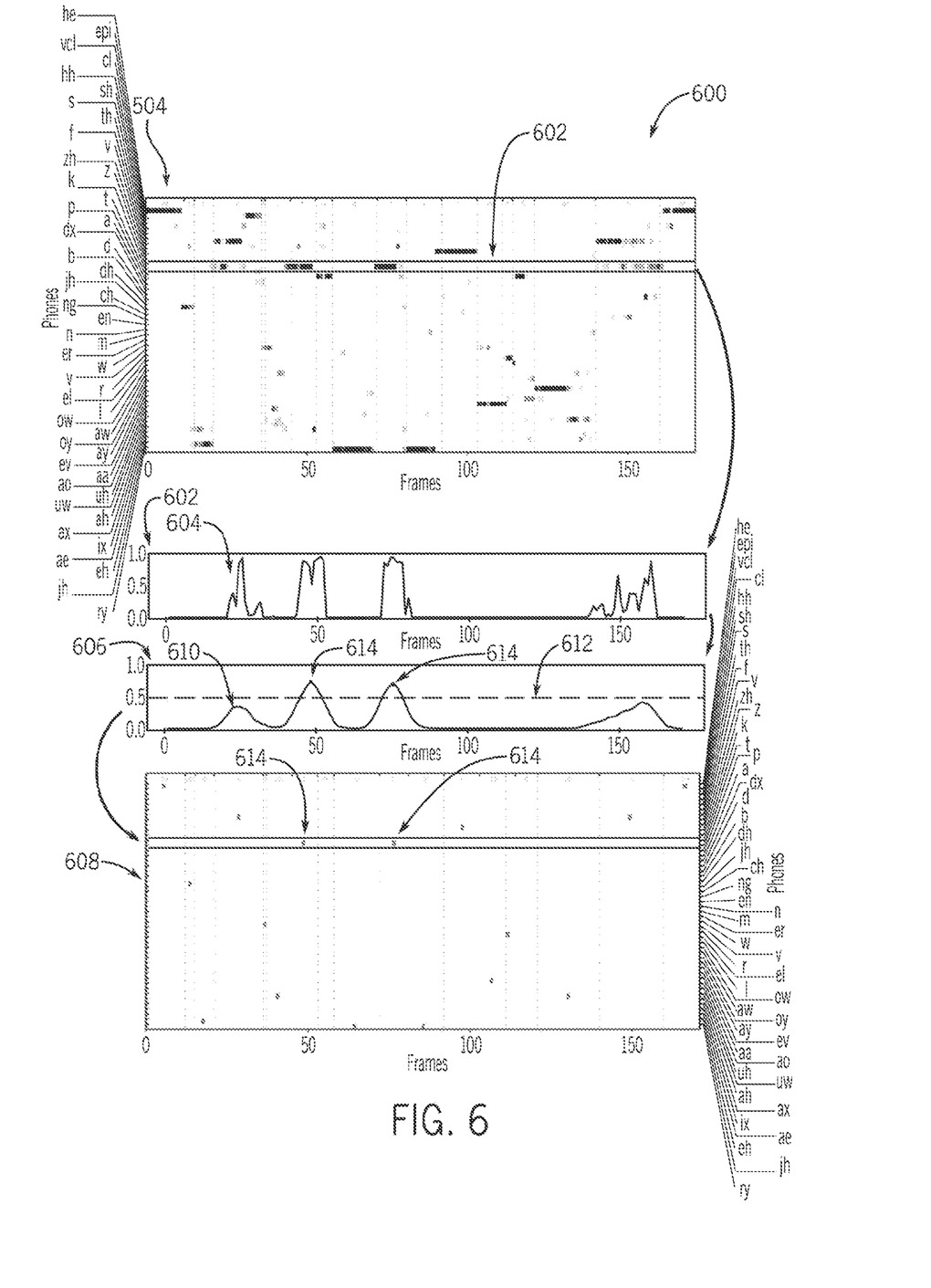
FIG. 6 is a flowchart illustrating the steps for reducing a posteriorgram to a discrete set of phonetic events in accordance with the present invention.

Referring again to FIG. 4, at process block 406, sparse phonetic event times are determined. The above-described signal including speech is decomposed into a sparse set of phonetic impulses. Referring to FIG. 6, the steps 600 of this process are shown. That is, given the posteriorgram 504, one can simplify the probability information for each discrete phone 602 by applying phone-specific filters. That is, a the keyword reference database 410 may be maintained to yield keyword models forming an ensemble of filters associated with each keyword in the database. In this method, the raw posterior trajectory 604 may be convolved with a matched filter to obtain a smoothed posterior trajectory 610. By extracting the maxima of the smoothed posterior trajectory above a threshold 610, a sparse series of phonetic events 614 can be obtained. The reduced event representation 608 illustrates the time occurrences of each phone in the utterance, which can then be stored and processed much more rapidly and efficiently, with minimal loss of information.

Referring again to FIG. 4, at process block 408, the phone events in an utterance are analyzed against keyword phonetic timing models. Specifically, keyword identification in speech can be performed using defined keywords. In this regard, the keyword reference database 410, which may include dictionary vocabulary 412 along with training example 414 data, may be used. With reference to FIG. 2, the keyword reference database 410 may be stored in the memory 206 or otherwise accessible to the processor 204, for example, through the networking systems 208 of the device 100.

Figure 7:
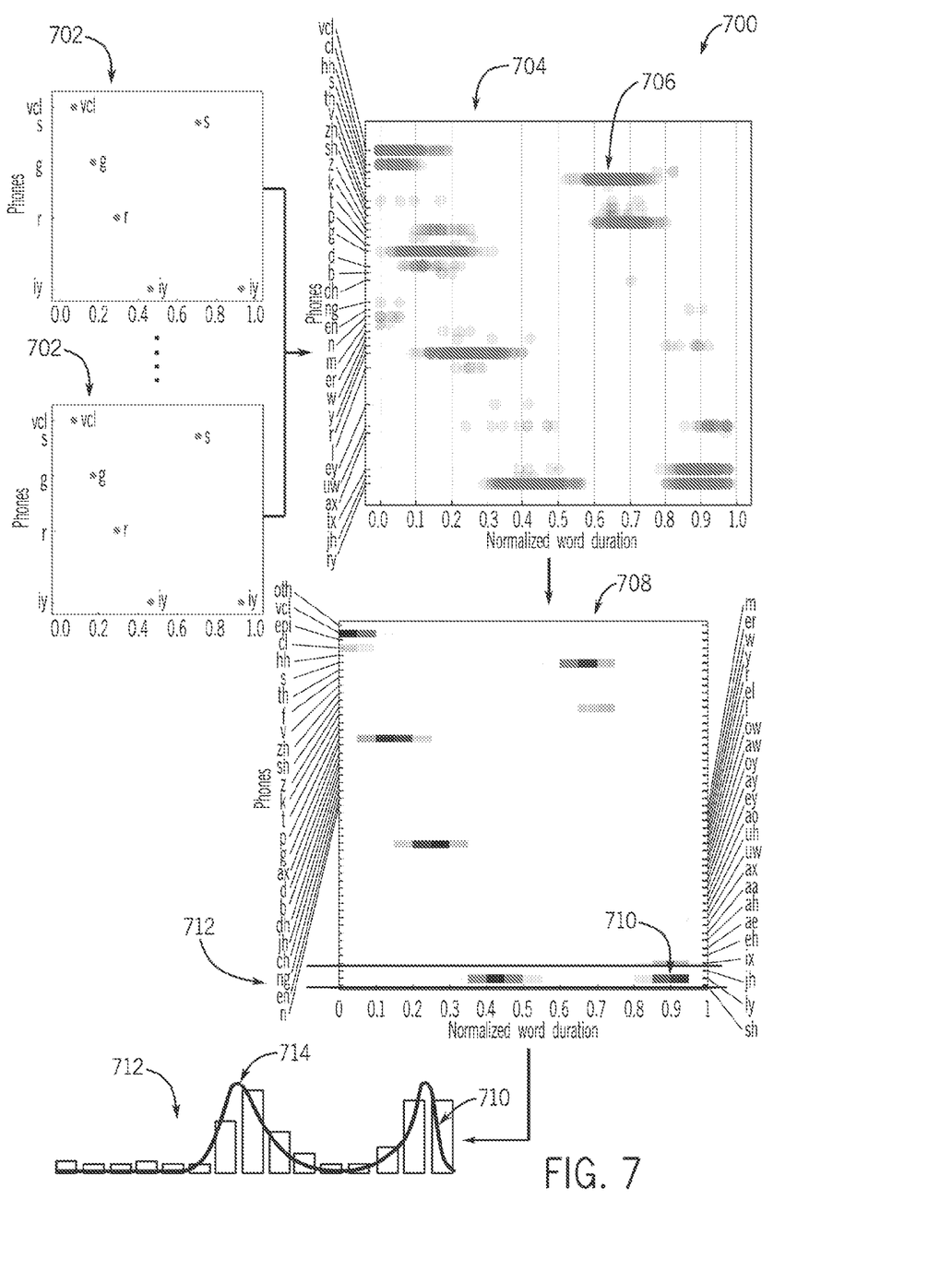
FIG. 7 is a schematic diagram illustrating the formation of keyword models in accordance with the present invention.

Information regarding reference keyword data may be reflected by models for phonetic events, which may be described using an inhomogeneous Poisson counting process and calculated using a maximum likelihood estimation (MLE) method. Referring to FIG. 7, a process 700 is illustrated, whereby keyword example data 702 may be pooled together, as shown in process block 704, to be used in the reference model. Since speech examples vary in phonetic duration, combining the data may be accomplished by considering the phonetic timing relative to a normalized keyword duration of, for example, 1.0. Under this simplifying assumption, the relative timing of phonetic events is independent of keyword duration, and only the relative timing is considered. Then, the variation 706 in the data may be summarized 708 by a series of phonetic histograms 710. For each phone, as for example 712, a Poisson rate parameter 714 represents a distribution, whose value changes over the duration of the keyword and takes a large value at positions within the keyword where the phone is likely to occur. Although each rate parameter 714 may, in an idealized representation, be a continuous function, it may be preferably approximated, for example, by a piecewise constant function, by dividing the keyword into D divisions. Consequently, a reference keyword model contains the collection of Poisson rate parameters extracted from a set of examples. Keyword spotting performance using these models is dependent on the quality of examples available.

Figure 8:
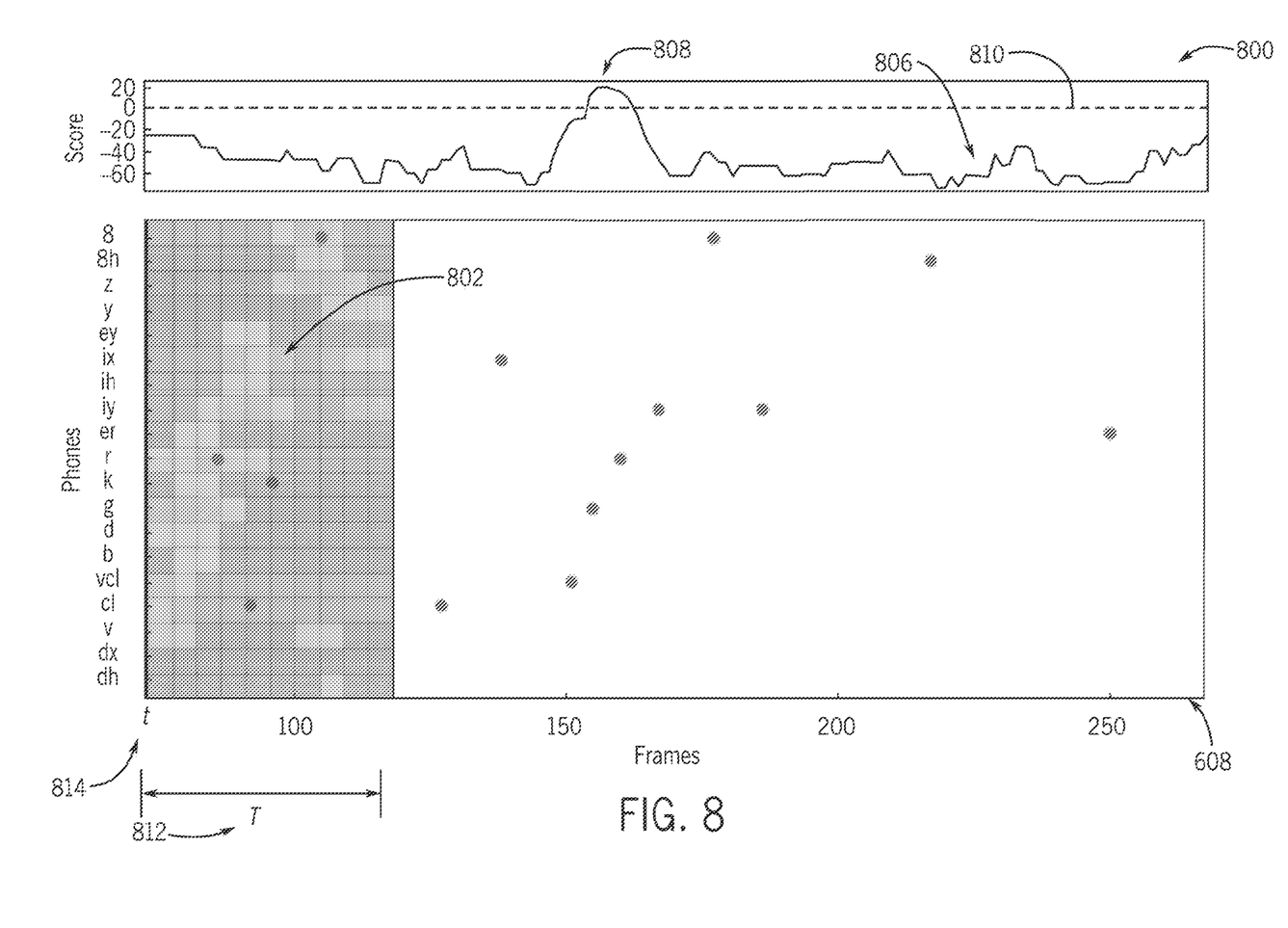
FIG. 8 is a schematic diagram illustrating the process of frame-by-frame keyword matching and scoring in accordance with the present invention.

Referring again to FIG. 4 and, in particular, process block 410, Identification of a keyword of interest in speech involves the application of the keyword model to a sparse phonetic utterance, and calculating a score that relates to the probability that the keyword occurred at a particular point in time. This process is illustrated in FIG. 8, whereby the keyword model 802 of time length, T, 812 is applied to the utterance 800 and a score is tracked as a function of time over the duration of the utterance 800. The score is quantified by calculating a detection function 806, described by, for example:

$$d_W(t) = \log\left[\frac{P(O(t)|\theta_W)}{P(O(t)|\theta_{bg})}\right] \quad (1)$$

where the numerator corresponds to the keyword-specific model parameters and the denominator corresponds to the background model parameters. The detection function 806 is a log likelihood ratio evaluated at a time 814, t, in an utterance, and when large values 808 are detected above a threshold 810, it is likely that the keyword has occurred.

The calculation of the detection function 806 at time t 814 may be approximated by performing summation of the products between the counts of phonetic events, n, and a matrix of score elements, ϕ, belonging to each keyword phone and time division.

$$d_W(t) = \sum_p \sum_d n_{p,d} \cdot \varphi_{p,d} \quad (2)$$

Figure 9:
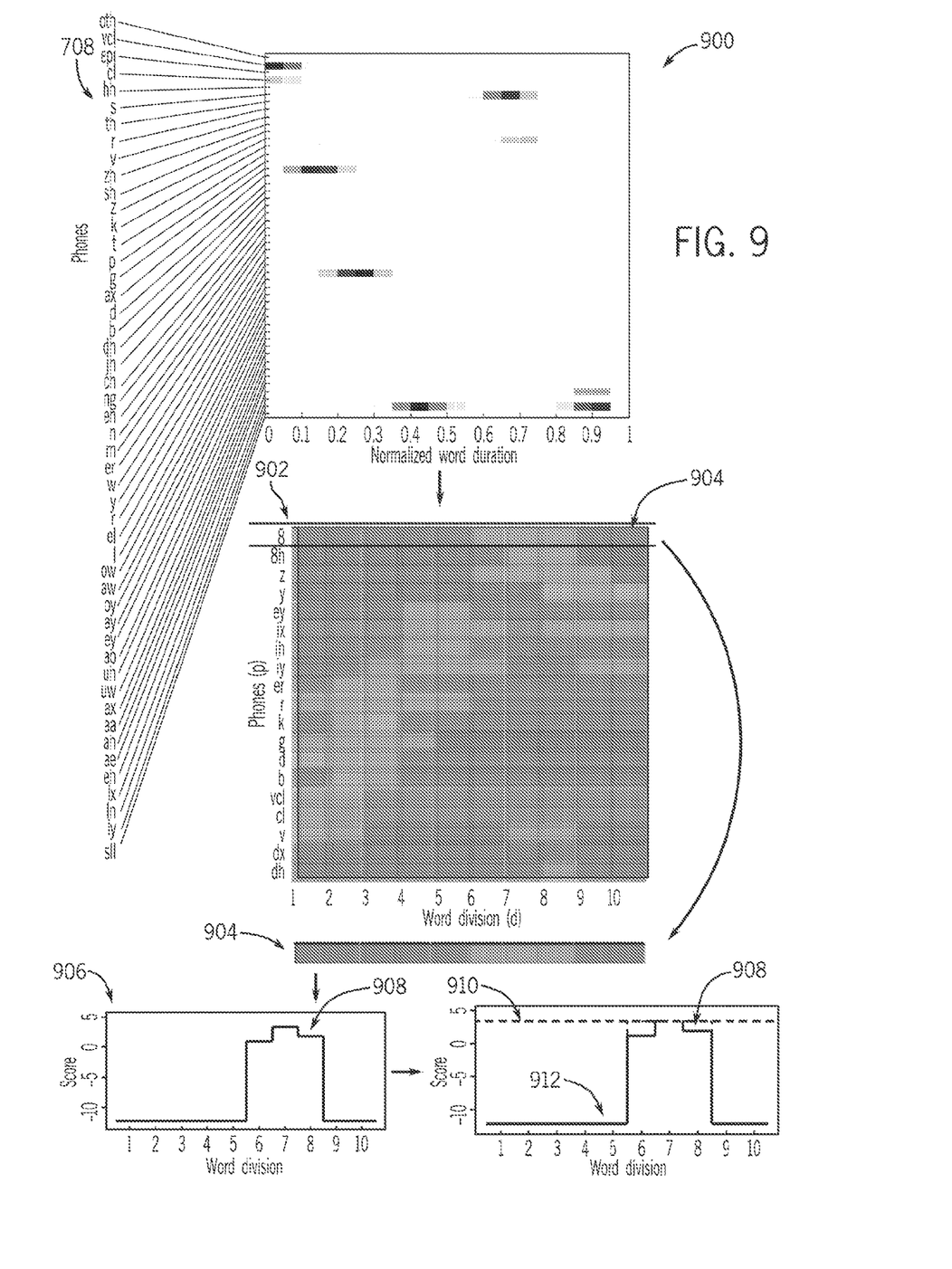
FIG. 9 is a schematic diagram describing a scoring matrix in accordance with the present invention.

Referring to the process 900 of FIG. 9, elements in the score matrix, $\phi_{p,d}$, 902 are obtained from reference example data 708. Another way to envision the computation of the detection function is to recognize it as the summation over all phones of a sequence of events convolved with its corresponding score vector. For each phone, p, a score vector, $\phi_d$, 904 contains elements that are related to the Poisson rate parameters belonging to each division, d, in the keyword model. The vector elements may be construed as a filter bank 906 with a profile 908 specific to each phone in the keyword model. To speed up computation, the score vectors 904 may be simplified by applying an upper bound 910, or a 3-segment bound 912.

As shown in FIG. 8, the calculation of the detection function described above may be performed one frame at a time and is computationally straightforward. However, the process may be further optimized by recognizing that an utterance has discrete events, which are sparse, and therefore changes in the detection function only occur when an event in the utterance enters or exists the frame of calculation 812. As such, computing the value of the detection function at each frame may be unnecessary. An approach that takes into consideration a differential in the detection function for each event may be more efficient, since fewer variables need to be computed. This reduced approach is summarized in FIG. 10, whereby only contributions from changes in the score vector 904 are tracked. For example, the phonetic event 1002 at time frame t=105 will experience 5 score changes based on the score vector profile 908, which are then added to the differential in the detection function at the corresponding positions in time. The process is repeated for each phonetic event and score vector shown.

Figure 10:
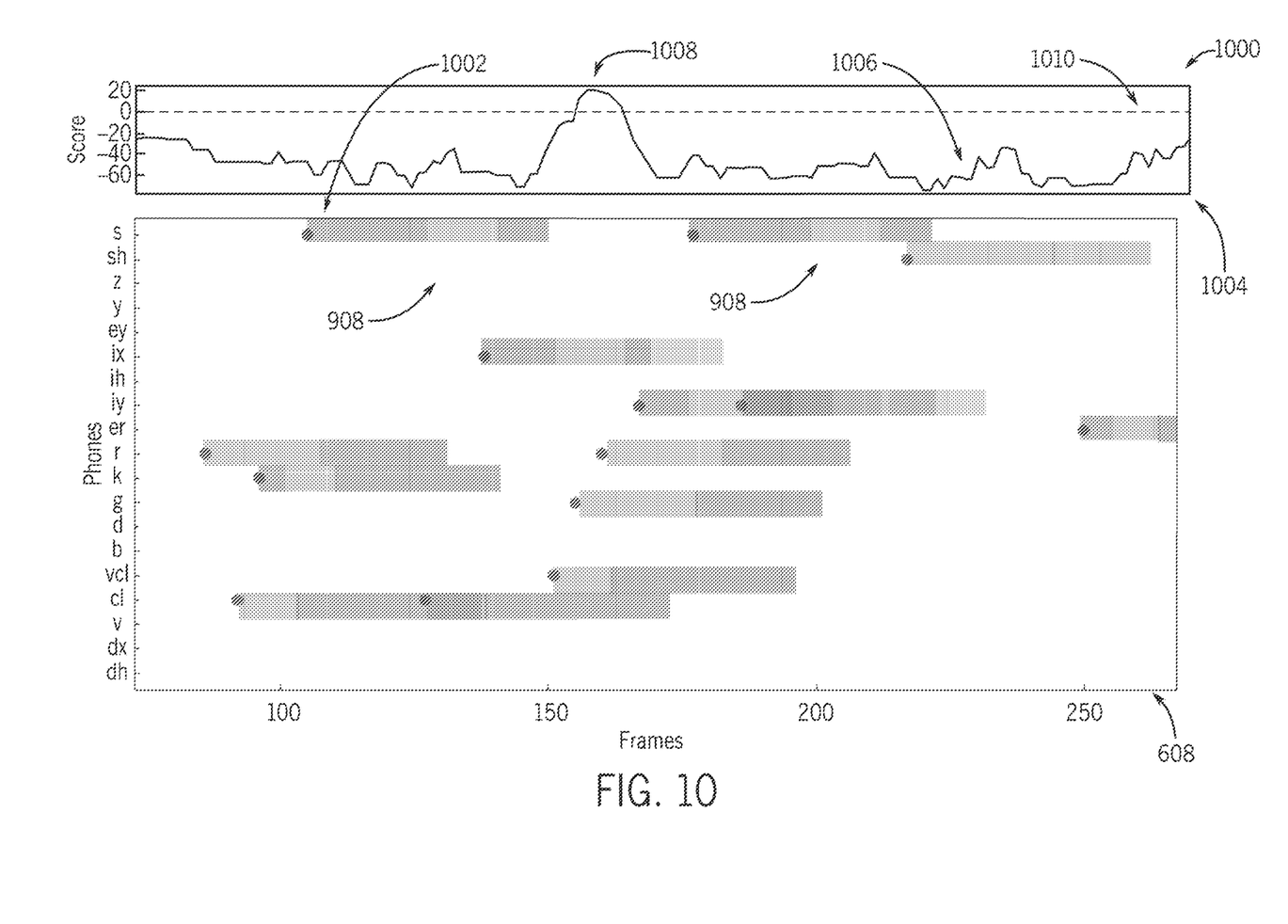
FIG. 10 is a schematic diagram illustrating the process of event-by-event keyword matching and scoring in accordance with the present invention.

Similarly to the frame-by-frame keyword matching process of FIG. 8, the event-by-event matching process 1004 tracks changes 1010 in a score function 1006 and identifies a maximum 1008 corresponding to a high probability identification. However, the calculation of the detection function is linear in the number of phonetic events, rather than the number of frames, which results in significant computational savings.

Referring again to FIG. 4, once a high confidence keyword has been identified in speech at process bock 412, a variety of actions may be taken based thereon. For example, the keyword may be compared to an instruction set and, if the keyword corresponds to an instruction matching a predetermined operational command, a command or control function may be carried out on the device 100 of FIGS. 1 and 2.

The system disclosed herein is configured to detect and retrieve speech signals from a file medium or an audio detection system, upon demand and continuously. The system includes a processor capable of reducing speech signals to a phonetic posteriorgram and then decomposing the posteriorgram into a sparse set of phonetic impulses. The system is also equipped with a database storage and retrieval capability, wherein an expandable keyword database is located. Based upon the examples in the database, the system computes a keyword model that is formulated and stored as a set of keyword filters, representative of a combined phonetic signature from all available examples. The system allows for modeling keywords when training data is abundant as well as scarce. Once a keyword that is associated with a pre-determined operational instruction is identified in a speech utterance, the system allows for the execution of the instruction.

The method for keyword spotting in speech described here employs a convolution algorithm applied between a series phonetic impulses of speech and a set keyword model filters representing examples in the database. The method computes a score differential at the time location of every impulse in the sparse speech signal. The value of the score differential is indicative of a likelihood for a keyword matching in speech, and a high value is reported that is indicative of a high probability match.

The event-based searching approach provides enhanced performance of keyword spotting compared to traditional methods, due to the scarcity of events in time that must be processed. Processing speeds can approach 500,000 times faster than real time, allowing for hundreds of thousands of keywords to be identified in parallel. The lack of necessity for high computational overhead makes this system and method ideal for electronic devices with limited resources and connectivity capabilities, including consumer electronics such as cameras and other portable devices.

The present invention has been described in terms of one or more preferred embodiments, and it should be appreciated that many equivalents, alternatives, variations, and modifications, aside from those expressly stated, are possible and within the scope of the invention.

The invention claimed is:

1. An electronic system configured to perform speech processing comprising:
   a memory having stored therein a database of keyword models, wherein the database of keyword models includes an ensemble of filters describing an evolution of phonetic events associated with each keyword in the database;
   a processor configured to:
      i) receive a signal including speech;
      ii) decompose the signal including speech into a sparse set of phonetic impulses;
      iii) access the database of keyword models;
      iv) identify keywords within the signal including speech using the sparse set of phonetic impulses and the database of keywords; and
      v) generate an output indicating the keywords identified in iv).

2. The system of claim 1 wherein the ensemble of filters is based upon Poisson rate parameters describing the evolution of phonetic events associated with each keyword in the database.

3. The system of claim 1 wherein the processor is further configured to generate a representation of speech as a sparse set of temporal phonetic events in response to the signal including speech in ii).

4. The system of claim 1 wherein the processor is further configured to compute a score for the phonetic impulses at each of a plurality of frames in time.

5. The system of claim 4 wherein the score relates a probability that a word occurred at particular point in time associated with a given frame in the plurality of frames in time.

6. The system of claim 1 wherein the database of keyword models includes an ensemble of filters associated with each keyword in the database and the processor is configured to convolve the sparse set of phonetic impulses with the ensemble of filters and calculate a score vector based on the convolving of the sparse set of phonetic impulses with ensemble of filters.

7. The system of claim 6 wherein the processor is further configured to identify keywords within the signal including speech based on the score vectors.

8. The system of claim 6 wherein the processor is further configured to track changes in the score vector to identify the keywords.

9. A method for performing speech processing comprising steps of:
   a) receiving a signal including speech;
   b) accessing a database of keyword models, wherein the database of keyword models includes an ensemble of filters describing an evolution of phonetic events associated with each keyword in the database;
   c) decomposing, with an electronic system, the signal including speech into a sparse set of impulses;
   d) accessing, with an electronic system, the database of keywords and process the sparse set of impulses with information from the database of keyword models;
   e) identifying, with an electronic system, keywords within the signal including speech based on step d); and
   f) controlling operation the electronic system based on the keywords identified in step e).

10. The method of claim 9 further comprising creating the ensemble of filters based upon Poisson rate parameters describing the evolution of phonetic events associated with each keyword in the database to form the database of keyword models.

11. The method of claim 9 wherein step c) includes generating a representation of speech as a sparse set of temporal phonetic events.

12. The method of claim 9 wherein step d) includes computing a score for the impulses at each of a plurality of frames in time.

13. The method of claim 12 wherein the score relates a probability that a word occurred at particular point in time associated with a given frame in the plurality of frames in time.

14. The method of claim 9 further comprising convolving the sparse set of impulses with an ensemble of filters available in the database of keyword models and calculating a score vector based on the convolving of the sparse set of impulses with ensemble of filters.

15. The method of claim 14 wherein step e) includes identifying keywords within the signal including speech based on the score vectors.

16. The method of claim 14 further comprising tracking changes in the score vector to identify the keywords.

17. An electronic system configured to perform speech processing comprising:
   an audio detection system configured to receive a signal and generate a representation of speech as a sparse set of events in time;
   a memory having stored therein a database of keyword models describing an evolution of events associated with each keyword in the database of keywords;
   a processor configured to:
      i) receive the representation of speech from the audio detection system;
      ii) decompose the representation of speech into a sparse set of phonetic impulses;
      iii) access the database of keywords and convolve the sparse set of phonetic impulses information in the database of keyword models;
      iv) identify keywords within the speech signal based on iii); and
      v) generate an output signal based on the keywords identified in iv).

18. The system of claim 17 wherein the processor is further configured to compute a score for the sparse set of phonetic impulses at each of a plurality of frames in time that relates a probability that a word occurred at particular point in time associated with a given frame in the plurality of frames in time.

19. The system of claim 17 wherein the processor is configured calculate a score vector based on the convolving of the sparse set of phonetic impulses with ensemble of filters.

20. The system of claim 19 wherein the processor is further configured to track changes in the score vector to identify the keywords.

* * * * *